(12) United States Patent
Kaule et al.

(10) Patent No.: US 10,134,109 B2
(45) Date of Patent: Nov. 20, 2018

(54) DEPICTION ARRANGEMENT

(71) Applicant: Giesecke+Devrient Currency Technology GmbH, Munich (DE)

(72) Inventors: Wittich Kaule, Emmering (DE); Michael Rahm, Hemau (DE); Wolfgang Rauscher, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 992 days.

(21) Appl. No.: 14/447,334

(22) Filed: Jul. 30, 2014

(65) Prior Publication Data

US 2015/0084962 A1   Mar. 26, 2015

Related U.S. Application Data

(63) Continuation of application No. 13/062,991, filed as application No. PCT/EP2009/005987 on Aug. 19, 2009.

(51) Int. Cl.
| | |
|---|---|
| *B42D 25/00* | (2014.01) |
| *G06T 3/40* | (2006.01) |
| *B42D 25/324* | (2014.01) |

(52) U.S. Cl.
CPC ............ *G06T 3/4053* (2013.01); *B42D 25/00* (2014.10); *B42D 25/324* (2014.10); *Y10T 29/49002* (2015.01)

(58) Field of Classification Search
CPC .... G06T 3/4053; B42D 25/324; B42D 25/00; Y10T 29/49002
(Continued)

(56) References Cited

U.S. PATENT DOCUMENTS

| 1,475,430 A | 11/1923 | Curwen |
|---|---|---|
| 5,712,731 A | 1/1998 | Drinkwater et al. |
(Continued)

FOREIGN PATENT DOCUMENTS

| DE | 3602563 | 4/1987 |
|---|---|---|
| DE | 19949542 | 4/2001 |
(Continued)

OTHER PUBLICATIONS

Durand F., Photography—Reversible Prints, Integral Photographs, (English translation of article by Lippman), Academy of the Sciences, Mar. 2, 1908 session, 4 pages.
(Continued)

*Primary Examiner* — Justin V Lewis
(74) *Attorney, Agent, or Firm* — Lathrop Gage LLP (57) ABSTRACT

The invention relates to a depiction arrangement for security papers, value documents, electronic display devices or other data carriers, having a grid image arrangement for depicting a target image (40) that is broken down into two or more partial target images (42, 44), having
  a motif image that is subdivided into a plurality of periodically or at least locally periodically arranged cells (24) in each of which are arranged mapped regions of one or more of the partial target images (42, 44),
  a viewing grid (22), composed of a plurality of viewing grid elements, that, when the motif image is viewed, reconstructs the complete target image (40) from the mapped regions arranged in the cells (24),
  the motif image being, independently of the cell subdivision, split into at least first and second microinformation regions (60, 62) in which the cells each include different combinations of mapped regions of the partial target images (40, 42), and the microinformation
(Continued)

regions (60, 62) being arranged in the shape of specified image motifs that exhibit information-bearing image patterns whose dimensions are below the resolution limit of the human eye.

20 Claims, 7 Drawing Sheets

(58) Field of Classification Search
USPC .......................... 283/67, 70, 72, 73, 74, 901
See application file for complete search history.

(56) References Cited

U.S. PATENT DOCUMENTS

| | | |
|---|---|---|
| 5,723,200 A | 3/1998 | Oshima et al. |
| 5,772,250 A | 6/1998 | Gasper |
| 6,288,842 B1 | 9/2001 | Florczak et al. |
| 6,329,040 B1 | 12/2001 | Oshima et al. |
| 7,667,894 B2 | 2/2010 | Hoffmuller |
| 7,728,931 B2 | 6/2010 | Hoffmuller |
| 7,808,605 B2 | 10/2010 | Hoffmuller |
| 7,986,459 B2 | 7/2011 | Kaule |
| 8,083,894 B2 | 12/2011 | Gruszczynski |
| 8,149,511 B2 | 4/2012 | Kaule |
| 8,251,404 B2 | 8/2012 | Depta |
| 8,317,231 B2 | 11/2012 | Heim |
| 8,322,751 B2 | 12/2012 | Fessl |
| 8,349,132 B2 | 1/2013 | Gregarek |
| 8,400,495 B2 | 3/2013 | Kaule |
| 8,400,673 B2 | 3/2013 | Depta |
| 8,490,879 B2 | 7/2013 | Heim |
| 8,526,085 B2 | 9/2013 | Dichtl |
| 8,534,708 B2 | 9/2013 | Heim |
| 8,534,709 B2 | 9/2013 | Hoffmuller |
| 8,534,710 B2 | 9/2013 | Hoffmuller |
| 8,550,340 B2 | 10/2013 | Schutzmann |
| 8,603,615 B2 | 12/2013 | Keller |
| 8,613,471 B2 | 12/2013 | Heim |
| 8,632,100 B2 | 1/2014 | Kaule |
| 8,685,488 B2 | 4/2014 | Hoffmuller |
| 8,733,797 B2 | 5/2014 | Heim |
| 8,740,095 B2 | 6/2014 | Dichtl |
| 8,771,803 B2 | 7/2014 | Dichtl |
| 8,778,481 B2 | 7/2014 | Kaule |
| 8,786,521 B2 | 7/2014 | Kaule |
| 8,794,674 B2 | 8/2014 | Heim |
| 8,875,628 B2 | 11/2014 | Depta |
| 8,878,844 B2 | 11/2014 | Kaule |
| 2003/0021437 A1* | 1/2003 | Hersch ................... B41M 3/14 283/74 |
| 2005/0052705 A1 | 3/2005 | Hersch et al. |
| 2006/0003295 A1 | 1/2006 | Hersch et al. |
| 2006/0202470 A1 | 9/2006 | Simske et al. |
| 2007/0177131 A1 | 8/2007 | Hansen |
| 2007/0211238 A1 | 9/2007 | Hoffmuller |
| 2007/0229263 A1 | 10/2007 | Staub et al. |
| 2007/0241553 A1 | 10/2007 | Heim |
| 2007/0246933 A1 | 10/2007 | Heim |
| 2008/0014378 A1 | 1/2008 | Hoffmuller |
| 2008/0037131 A1 | 2/2008 | Steenblik et al. |
| 2008/0054621 A1 | 3/2008 | Burchard |
| 2008/0160226 A1 | 7/2008 | Kaule et al. |
| 2008/0163994 A1 | 7/2008 | Hoppe |
| 2008/0182084 A1 | 7/2008 | Tompkin et al. |
| 2008/0216976 A1 | 9/2008 | Ruck |
| 2008/0258456 A1 | 10/2008 | Rahm |
| 2008/0259416 A1 | 10/2008 | Peters et al. |
| 2009/0001709 A1 | 1/2009 | Kretschmar |
| 2009/0008923 A1 | 1/2009 | Kaule et al. |
| 2009/0008926 A1 | 1/2009 | Depta |
| 2009/0102605 A1 | 4/2009 | Kaule |
| 2009/0115185 A1 | 5/2009 | Hoffmuller |
| 2009/0218397 A1 | 9/2009 | Wild et al. |
| 2009/0290221 A1 | 11/2009 | Hansen et al. |
| 2009/0322071 A1* | 12/2009 | Dichtl ................... D21H 21/42 283/70 |
| 2010/0182221 A1 | 7/2010 | Kaule et al. |
| 2010/0194532 A1 | 8/2010 | Kaule et al. |
| 2010/0307705 A1 | 12/2010 | Rahm |
| 2011/0007374 A1 | 1/2011 | Heim |
| 2011/0027538 A1 | 2/2011 | Hoffmann |
| 2011/0045248 A1 | 2/2011 | Hoffmuller et al. |
| 2011/0091665 A1 | 4/2011 | Heim |
| 2011/0101670 A1 | 5/2011 | Heim |
| 2011/0109078 A1 | 5/2011 | Hoffmuller |
| 2011/0157183 A1 | 6/2011 | Kaule |
| 2012/0126525 A1 | 5/2012 | Dorfler |
| 2012/0170124 A1 | 7/2012 | Fuhse |

FOREIGN PATENT DOCUMENTS

| | | |
|---|---|---|
| DE | 102004007379 | 9/2005 |
| DE | 102004031879 | 1/2006 |
| DE | 102004059798 | 6/2006 |
| DE | 102005028162 | 12/2006 |
| DE | 102005052562 | 5/2007 |
| DE | 102005062132 | 7/2007 |
| DE | 102006006501 | 8/2007 |
| DE | 102006029536 | 12/2007 |
| DE | 102006029850 | 1/2008 |
| DE | 102007029203 | 1/2009 |
| DE | 102007062089 | 7/2009 |
| EP | 0064067 | 11/1982 |
| EP | 0238043 | 9/1987 |
| EP | 0330733 | 9/1989 |
| EP | 1554700 | 1/2007 |
| EP | 1953002 | 1/2008 |
| GB | 2362493 | 11/2001 |
| JP | H10-035083 | 2/1998 |
| JP | 2001-055000 | 2/2001 |
| JP | 2003-039583 | 3/2003 |
| JP | 2003-120500 | 4/2003 |
| WO | WO 1994/027254 | 11/1994 |
| WO | WO 1999/013157 | 3/1999 |
| WO | WO 2003/005075 | 1/2003 |
| WO | WO 2005/052650 | 6/2005 |
| WO | WO 2005/106601 | 11/2005 |
| WO | WO 2006/029745 | 3/2006 |
| WO | WO 2006/087138 | 8/2006 |
| WO | WO 2007/007793 | 1/2007 |
| WO | WO 2007/030530 | 3/2007 |
| WO | WO 2007/076952 | 7/2007 |
| WO | WO 2007/087984 | 8/2007 |
| WO | WO 2007/131765 | 11/2007 |
| WO | WO 2008/000350 | 1/2008 |
| WO | WO 2008/000351 | 1/2008 |
| WO | WO 2008000351 A2 * | 1/2008 ............. D21H 21/42 |
| WO | WO 2009/000528 | 12/2008 |
| WO | WO 2009/000529 | 12/2008 |

OTHER PUBLICATIONS

German Search Report, German Patent Application No. DE 102007029204, dated Aug. 21, 2007, 4 pages.

German Search Report, German Patent Application No. DE 102007029203, dated Aug. 23, 2007, 4 pages.

Hutley M.C. et al., The moiré magnifier, Pure Appl. Opt. 3:133-142, 1994.

International Preliminary Report on Patentability, International Application No. PCT/EP2008/005173, Corrected Version, English Translation, dated Mar. 22, 2010, 6 pages.

International Preliminary Report on Patentability, International Application No. PCT/EP2008/005172, English Translation, dated Apr. 1, 2010, 5 pages.

International Preliminary Report on Patentability, International Application No. PCT/EP2008/005174, English Translation, dated Mar. 1, 2010, 7 pages.

International Preliminary Report on Patentability, International Application No. PCT/EP2008/005171, English Translation, dated Mar. 29, 2010, 4 pages.

(56) References Cited

OTHER PUBLICATIONS

International Preliminary Report on Patentability, International Application No. PCT/EP2009/004326, English Translation, dated Mar. 22, 2011, 5 pages.
International Preliminary Report on Patentability, International Application No. PCT/EP2009/005987, English Translation, dated May 4, 2011, 5 pages.
International Search Report, International Application No. PCT/EP2008/005173, dated Dec. 15, 2008, 3 pages.
International Search Report, International Application No. PCT/EP2008/005172, dated Nov. 21, 2008, 2 pages.
International Search Report, International Application No. PCT/EP2008/005174, dated Feb. 16, 2009, 3 pages.
International Search Report, International Application No. PCT/EP2008/005171, dated Nov. 21, 2008, 2 pages.
International Search Report, International Application No. PCT/EP2009/004326, dated Oct. 19, 2009, 3 pages.
International Search Report, International Application No. PCT/EP2009/005987, dated Jan. 27, 2010, 3 pages.
Kamal H. et al., Properties of moiré magnifiers, Optical Engineering 37(11):3007-3014, Nov. 1998.
Lippmann M. G., Epreuves reversibles—Photographies integrales, Comptes Rendues Acad. Sci. Paris 146:446-451, 1908 (in French).
Rahm, Michael, Modulo mapping—Novel Method to Arrange Microstructures for Moiré Magnifier Type Security Features, Abstract, Session 5: Optically Variable Security I, Jan. 22, 2010, Optical Document Security II, The 2010 Conference on Optical Security and Counterfeit Deterrence, Jan. 20-22, 2010, San Francisco, p. 1-5.
Rauscher W. et al., Novel method to arrange microstructures for moiré magnifier type security features, Optical Document Security II, San Francisco, Jan. 20-22, 2010, pp. 1-11.

\* cited by examiner

DEPICTION ARRANGEMENT

CROSS-REFERENCE TO RELATED APPLICATIONS

This application is a continuation of U.S. patent application Ser. No. 13/062,991, filed Mar. 9, 2011, which is the U.S. National Stage of International Application No. PCT/EP2009/005987, filed Aug. 19, 2009, which claims the benefit of German Patent Application DE 10 2008 046 511.9, filed Sep. 10, 2008, all of which are hereby incorporated by reference to the extent not inconsistent with the disclosure herewith.

The present invention relates to a depiction arrangement for security papers, value documents, electronic display devices or other data carriers for depicting a target image.

For protection, data carriers, such as value or identification documents, but also other valuable articles, such as branded articles, are often provided with security elements that permit the authenticity of the data carrier to be verified, and that simultaneously serve as protection against unauthorized reproduction. Data carriers within the meaning of the present invention include especially banknotes, stocks, bonds, certificates, vouchers, checks, valuable admission tickets and other papers that are at risk of counterfeiting, such as passports and other identity documents, credit cards, health cards, as well as product protection elements, such as labels, seals, packaging and the like. In the following, the term "data carrier" encompasses all such articles, documents and product protection means.

The security elements can be developed, for example, in the form of a security thread embedded in a banknote, a tear strip for product packaging, an applied security strip, a cover foil for a banknote having a through opening, or a self-supporting transfer element, such as a patch or a label that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanopatterns, such as with conventional embossed holograms or other hologram-like diffraction patterns, as are described, for example, in publications EP 0 330 733 A1 and EP 0 064 067 A1.

From publication U.S. Pat. No. 5,712,731 A is known the use of a moiré magnification arrangement as a security feature. The security device described there exhibits a regular arrangement of substantially identical printed microimages having a size up to 250 µm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. As with every pair of similar grids, a moiré pattern results that, in this case, appears as a magnified and, if applicable, rotated image of the repeated elements of the image grid.

Based on that, the object of the present invention is to avoid the disadvantages of the background art and especially to specify a depiction arrangement of the kind cited above having high counterfeit security.

This object is solved by the depiction arrangement having the features of the independent claims. A method for manufacturing such a depiction arrangement, a security paper, a data carrier and an electronic display arrangement having such depiction arrangements are specified in the coordinated claims. Developments of the present invention are the subject of the dependent claims.

According to the present invention, a generic depiction arrangement includes a grid image arrangement for displaying a target image that is broken down into two or more partial target images, having a motif image that is subdivided into a plurality of periodically or at least locally periodically arranged cells in each of which are arranged mapped regions of one or more of the partial target images, a viewing grid, composed of a plurality of viewing grid elements, that, when the motif image is viewed, reconstructs the complete target image from the mapped regions arranged in the cells, the motif image being, independently of the cell subdivision, split into at least first and second microinformation regions in which the cells each include different combinations of mapped regions of the partial target images, and the microinformation regions being arranged in the shape of specified image motifs that exhibit information-bearing image patterns whose dimensions are below the resolution limit of the human eye.

The present invention is thus based on the idea of hiding a higher-level security feature in the form of a specified image motif within the motif image through a splitting of the target image into multiple partial target images and a suitable arrangement of the cells associated with the partial target images. In this way, the counterfeit security of the depiction arrangement can be significantly increased without impairing the visual appearance of the depicted target image upon viewing. Since the dimensions of the information-bearing image patterns of the specified image motif are below the resolution limit of the eye, that is, in ranges below about an angular minute, the image motif forms, within the motif image, a code that is non-visible with naked eye and that can be detected, for example, with a microscope.

The microinformation regions according to the present invention each preferably extend across multiple cells of the motif image. Here, the microinformation regions can each be composed of a plurality of cells of the motif image. However, the microinformation regions are preferably developed having an arbitrary shape differing from the cell subdivision, and then at least partially intersect the cell boundaries of the motif image cells.

In advantageous embodiments, the information-bearing image patterns exhibit dimensions that are below about 100 µm, such that said image patterns cannot be resolved by the human eye at a viewing distance of about 30 cm, and when viewed with the viewing grid, the reconstructed partial target images of the first and second microinformation regions are superimposed to form the target image for the human eye.

The information-bearing patterns are advantageously present in the form of pixels or lines. In their totality, they form the specified image motif.

In advantageous embodiments, the microinformation regions are arranged in the form of alphanumeric characters, an alphanumeric character string, for example a text, or a logo. The microinformation regions arranged in the form of alphanumeric characters advantageously exhibit a lateral dimension of 300 µm or less, preferably of 200 µm or less, and particularly preferably of 150 µm or less. Thus, the dimensions of the information-bearing image patterns of the alphanumeric characters, that is, the line widths, are below the resolution limit of the human eye, as said line widths are generally about ⅒ to ⅓ of the lateral dimensions of the alphanumeric characters.

In advantageous embodiments, it is appropriate that the image motifs of the microinformation regions periodically repeat within the motif image. In other advantageous embodiments, the image motifs of the microinformation regions within the motif image repeat in irregular sequence.

Alternatively or additionally, it can be provided that the first and second microinformation regions each arranged in different specified regions within the motif image differ from each other, such that the hidden image motifs of the respective microinformation regions change over the expanse of the motif image. In this way, it is possible to provide in the motif image, with the same visual appearance of the depicted target image, multiple different codes that are non-visible with the naked eye.

In an advantageous, particularly simple embodiment, the cells of the motif image each include mapped regions of only one of the partial target images, the first and second microinformation regions including mapped regions of different partial target images.

In an advantageous variant of the present invention, the depiction arrangement constitutes a moiré magnification arrangement in which the mapped regions of the cells of the motif image each constitute scaled-down images of the partial target images, which are completely accommodated within one cell. Here, the arrangement of cells of the motif image and/or of the viewing grid advantageously exhibits, in its periodic or at least locally periodic regions, no axis of symmetry in the plane of the arrangement or of the grid. In another preferred embodiment, upon tilting the depiction arrangement, the complete target image moves in a specified direction that, with the tilt direction, encloses an angle γ not equal to 0° and not equal to 90°. In a further preferred embodiment, the arrangement of cells of the motif image and the viewing grid form dissimilar lattices that are coordinated with each other in such a way that, upon tilting the depiction arrangement, an orthoparallactic movement effect of the target image occurs.

In an alternative, likewise advantageous variant of the present invention, the depiction arrangement constitutes a micro-optical moiré-type magnification arrangement in which the mapped regions of multiple spaced-apart cells of the motif image, taken together, depicts in each case a scaled-down image of one of the partial target images, whose dimension is larger than one cell of the motif image.

While, in the above-mentioned moiré magnification arrangements, the mapped regions of the cells of the motif image each constitute scaled-down images of the partial target images that must fit completely in one cell of the motif image, this is not required in modulo magnification arrangements. According to a further, likewise advantageous variant of the present invention, the depiction arrangement thus constitutes a modulo magnification arrangement in which the mapped regions of the cells of the motif image each constitute non-complete sections, mapped by a modulo operation, of one or more of the partial target images.

All described variants can be executed having two-dimensional viewing element grids, especially lens grids, in lattice arrangements of arbitrary low or high symmetry or in cylindrical lens arrangements. All arrangements can also be calculated for curved surfaces, as described in principle in publication WO 2007/076952 A2, the disclosure of which is incorporated in the present application by reference.

In a preferred embodiment, the viewing elements of the viewing grid are arranged periodically or locally periodically, the local period parameters in the latter case preferably changing only slowly in relation to the periodicity length. Here, the periodicity length or the local periodicity length is especially between 3 µm and 50 µm, preferably between 5 µm and 30 µm, particularly preferably between about 10 µm and about 20 µm. Also an abrupt change in the periodicity length is possible if it was previously kept constant or nearly constant over a segment that is large compared with the periodicity length, for example for more than 20, 50 or 100 periodicity lengths.

The viewing elements can be formed by non-cylindrical microlenses or concave microreflectors, especially by microlenses or concave microreflectors having a circular or polygonally delimited base area, or also by elongated cylindrical lenses or concave cylindrical reflectors whose dimension in the longitudinal direction is more than 250 µm, preferably more than 300 µm, particularly preferably more than 500 µm and especially more than 1 mm. In further preferred variants of the present invention, the viewing elements are formed by circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

In an advantageous variant of the present invention, the viewing grid and the motif image of the depiction arrangement are firmly joined together and, in this way, form a security element having a stacked, spaced-apart viewing grid and motif image. The motif image and the viewing grid are advantageously arranged at opposing surfaces of an optical spacing layer. The security element can especially be a security thread, a tear strip, a security band, a security strip, a patch or a label for application to a security paper, value or identification document or the like. The total thickness of the security element is preferentially below 50 µm, preferably below 30 µm and particularly preferably below 20 µm.

According to another, likewise advantageous variant of the present invention, the viewing grid and the motif image of the depiction arrangement are arranged at different positions of a data carrier in such a way that the viewing grid and the motif image are stackable for self-authentication, and form a security element in the stacked state. The viewing grid and the motif image are especially stackable by bending, creasing, buckling or folding the data carrier.

According to a further, likewise advantageous variant of the present invention, the motif image is displayed by an electronic display device and the viewing grid is firmly joined with the electronic display device for viewing the displayed motif image. Instead of being firmly joined with the electronic display device, the viewing grid can also be a separate viewing grid that is bringable onto or in front of the electronic display device for viewing the displayed motif image.

In the context of this description, the security element can thus be formed both by a viewing grid and motif image that are firmly joined together, as a permanent security element, and by a viewing grid that exists spatially separately and an associated motif image, the two elements forming, upon stacking, a temporarily perceptible security element.

The present invention also includes a method for manufacturing a depiction arrangement of the kind described, in which
- a target image to be depicted is broken down into two or more partial target images,
- in a motif plane, a motif image is produced that is subdivided into a plurality of periodically or at least locally periodically arranged cells in each of which are arranged mapped regions of one or more of the partial target images,
- a viewing grid composed of a plurality of viewing grid elements is produced that, when the motif image is viewed, reconstructs the complete target image from the mapped regions arranged in the cells,
- the motif image being, independently of the cell subdivision, split into at least first and second microinformation regions in which the cells are each filled with different combinations of mapped regions of the partial target images, and the microinformation regions being arranged in the shape of specified image motifs that exhibit information-bearing image patterns whose dimensions are below the resolution limit of the human eye.

In all aspects of the present invention, the security element produced by the joining of the viewing grid and the motif image preferably constitutes a security thread, a tear strip, a security band, a security strip, a patch or a label for application to a security paper, value or identification document or the like. In an advantageous embodiment, the security element can span a transparent or gap region of a data carrier. Here, different appearances can be realized on different sides of the data carrier. Also two-sided designs can be used in which viewing grids are arranged on both sides of a motif image.

Further, the motif image can advantageously be displayed by an electronic display device. Here, for viewing the displayed motif image, the viewing grid can be firmly joined with the electronic display device or can be a separate viewing grid that is bringable onto or in front of the electronic display device.

The inventive grid image arrangements for depicting the target image that is broken down into two or more partial target images can be combined with at least one further grid image arrangement for depicting the target image that is not broken down into partial target images. Further, the grid image arrangements according to the present invention can also be combined with other security features, for example with diffractive patterns, with hologram patterns in all embodiment variants, metalized or not metalized, with sub-wavelength patterns, metalized or not metalized, with sub-wavelength lattices, with layer systems that display a color shift upon tilting, semitransparent or opaque, with diffractive optical elements, with refractive optical elements, such as prism-type beam shapers, with special types of holes, with security features having a specifically adjusted electrical conductivity, with incorporated materials having a magnetic code, with materials having a phosphorescent, fluorescent or luminescent effect, with security features based on liquid crystals, with matte patterns, with micromirrors, with elements having a window-blind effect, or with sawtooth patterns. Further security features with which the grid image arrangements according to the present invention can be combined are specified in publication WO 2005/052650 A2 on pages 71 to 73; these are incorporated in the present description by reference.

Finally, the present invention also includes a security paper for manufacturing security or value documents, such as banknotes, checks, identification cards, certificates and the like, having a depiction arrangement of the kind described above. The present invention further includes a data carrier, especially a branded article, a value document, a decorative article, such as packaging, postcards or the like, having a depiction arrangement of the kind described above. Here, the viewing grid and/or the motif image of the depiction arrangement can be arranged contiguously, on sub-areas or in a window region of the data carrier.

The present invention also relates to an electronic display arrangement having an electronic display device, especially a computer or television screen, a control device and a depiction arrangement of the kind described above. Here, the control device is designed and set to display the motif image of the depiction arrangement on the electronic display device. Here, the viewing grid for viewing the displayed motif image can be firmly joined with the electronic display device or can be a separate viewing grid that is bringable onto or in front of the electronic display device for viewing the displayed motif image.

Further exemplary embodiments and advantages of the present invention are described below with reference to the drawings. To improve clarity, a depiction to scale and proportion is dispensed with in the drawings.

Shown are:

FIG. 1 a schematic diagram of a banknote having an embedded security thread and an affixed transfer element, FIG. 2 schematically, the layer structure of a security element according to the present invention, in cross section, FIG. 3 highly schematically, a modulo magnification arrangement for defining the different planes, FIG. 4 in (a), as the target image to be depicted, a cross motif that is broken down into the two partial target images shown in (b), and in (c), a specified lens array having spherical microlenses that are arranged in a simple, rotated square lattice, FIG. 5 in (a) and (b), in each case, a section of the periodic arrangements of the micromotif elements associated with the partial target images in FIG. 4(b), in a motif grid U, FIG. 6 in (a) an inventive split of the motif image into first and second microinformation regions, in (b), schematically, the arrangement of the micromotif elements, filled in differently for illustration, in the first and second microinformation regions, and in (c), the appearance of the finished motif image without the additional highlightings of the different regions, and FIG. 7 in (a) to (c), a depiction as in FIG. 6 for an exemplary embodiment in which the split of the motif image into microinformation regions does not follow the orientation of the motif image cells.

Figure 1:
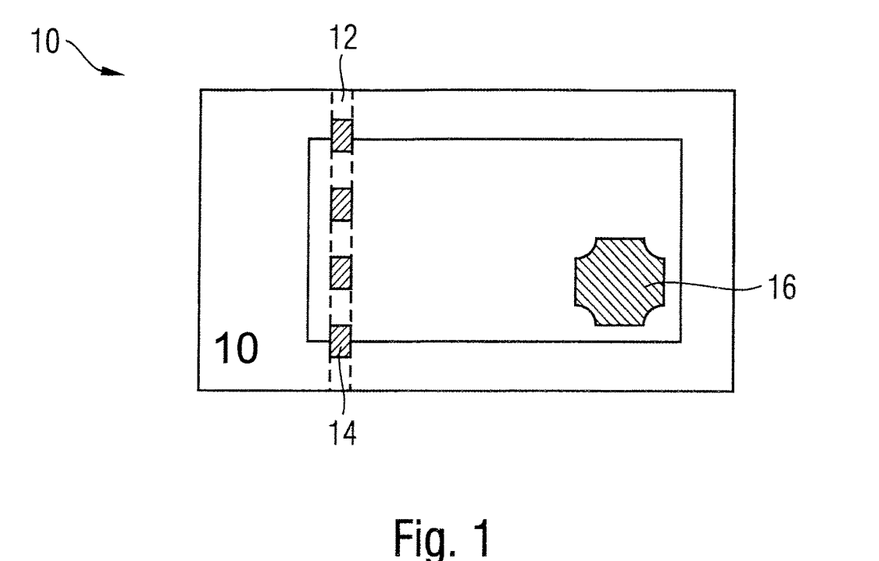

The invention will now be explained using the example of security elements for banknotes. For this, FIG. 1 shows a schematic diagram of a banknote 10 that is provided with two security elements 12 and 16 according to exemplary embodiments of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. The security element 16 can also be developed in the form of a cover foil that is arranged over a window region or a through opening in the banknote. The security element can be designed for viewing in top view, looking through, or for viewing both in top view and looking through. Also two-sided designs can be used in which lens grids are arranged on both sides of a motif image.

Both the security thread 12 and the transfer element 16 can include a moiré-magnification arrangement, a moiré-type micro-optical magnification arrangement or a modulo magnification arrangement according to an exemplary embodiment of the present invention. Since the latter includes the moiré magnification arrangements and the moiré-type magnification arrangements as special cases, in the following, the general term modulo magnification arrangements is used when one of these embodiments is being addressed.

Figure 2:
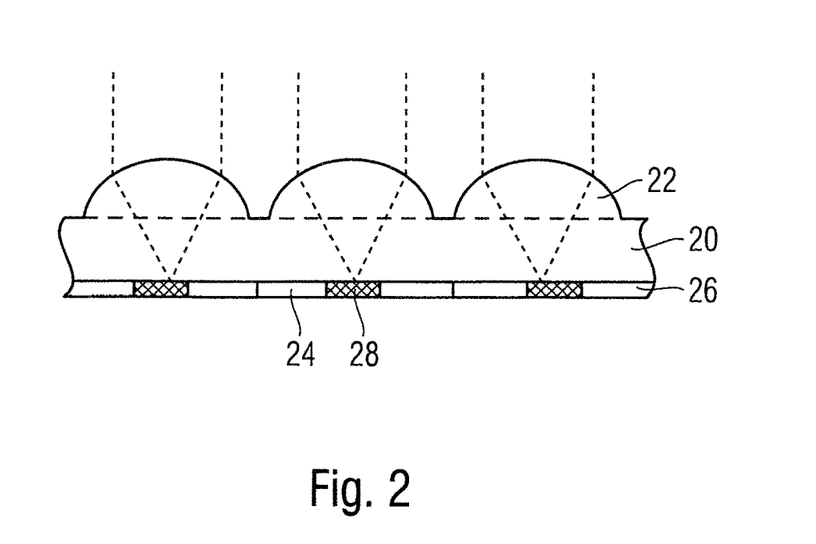

FIG. 2 shows schematically the layer structure of a security element according to the present invention, in cross section, with only the portions of the layer structure that are required to explain the functional principle being depicted. The security element includes a substrate 20 in the form of a transparent plastic foil, in the exemplary embodiment a polyethylene terephthalate (PET) foil about 20 µm thick. The top of the carrier foil 20 is provided with a grid-shaped arrangement of microlenses 22 that form, on the surface of the carrier foil, a two-dimensional Bravais lattice having a prechosen symmetry. The Bravais lattice can exhibit, for example, a hexagonal lattice symmetry. However, also other, especially lower, symmetries and thus more general shapes are possible, such as the symmetry of a parallelogram lattice.

The spacing of adjacent microlenses 22 is preferably chosen to be as small as possible in order to ensure as high an areal coverage as possible and thus a high-contrast depiction. The spherically or aspherically designed microlenses 22 preferably exhibit a diameter between 5 µm and 50 µm, and especially a diameter between merely 10 µm and 35 µm, and are thus not perceptible with the naked eye. It is understood that, in other designs, also larger or smaller dimensions may be used. For example, the microlenses in modulo magnification arrangements can exhibit, for decorative purposes, a diameter between 50 µm and 5 mm, while in modulo magnification arrangements that are to be decodable only with a magnifier or a microscope, also dimensions below 5 µm can be used.

On the bottom of the carrier foil 20 is arranged a motif layer 26 that includes a motif image, subdivided into a plurality of cells 24, having motif image elements 28. The arrangement of the lattice cells 24 likewise forms a two-dimensional Bravais lattice having a prechosen symmetry.

Here, in the case of a moiré magnification arrangement, the Bravais lattice of the lattice cells 24 differs slightly in its symmetry and/or in the size of its lattice parameters from the Bravais lattice of the microlenses 22, as indicated in FIG. 2 by the offset of the lattice cells 24 with respect to the microlenses 22. Depending on the type and size of the relative difference in the symmetry and/or in the lattice parameters of the Bravais lattices used, a moiré-magnified image of the motif image elements 28 is created when the motif image is viewed.

Here, the lattice period and the diameter of the lattice cells 24 are on the same order of magnitude as those of the microlenses 22, so preferably in the range from 5 µm to 50 µm and especially in the range from 10 µm to 35 µm, such that also the motif image elements 28 themselves are not perceptible with the naked eye. In designs having the above-mentioned larger or smaller microlenses, of course also the lattice cells 24 are developed to be larger or smaller, accordingly.

The optical thickness of the carrier foil 20 and the focal length of the microlenses 22 are coordinated with each other in such a way that the motif layer 26 is located approximately the lens focal length away. The carrier foil 20 thus forms an optical spacing layer that ensures a desired constant separation of the microlenses 22 and the motif layer 26 having the motif image.

Figure 3:
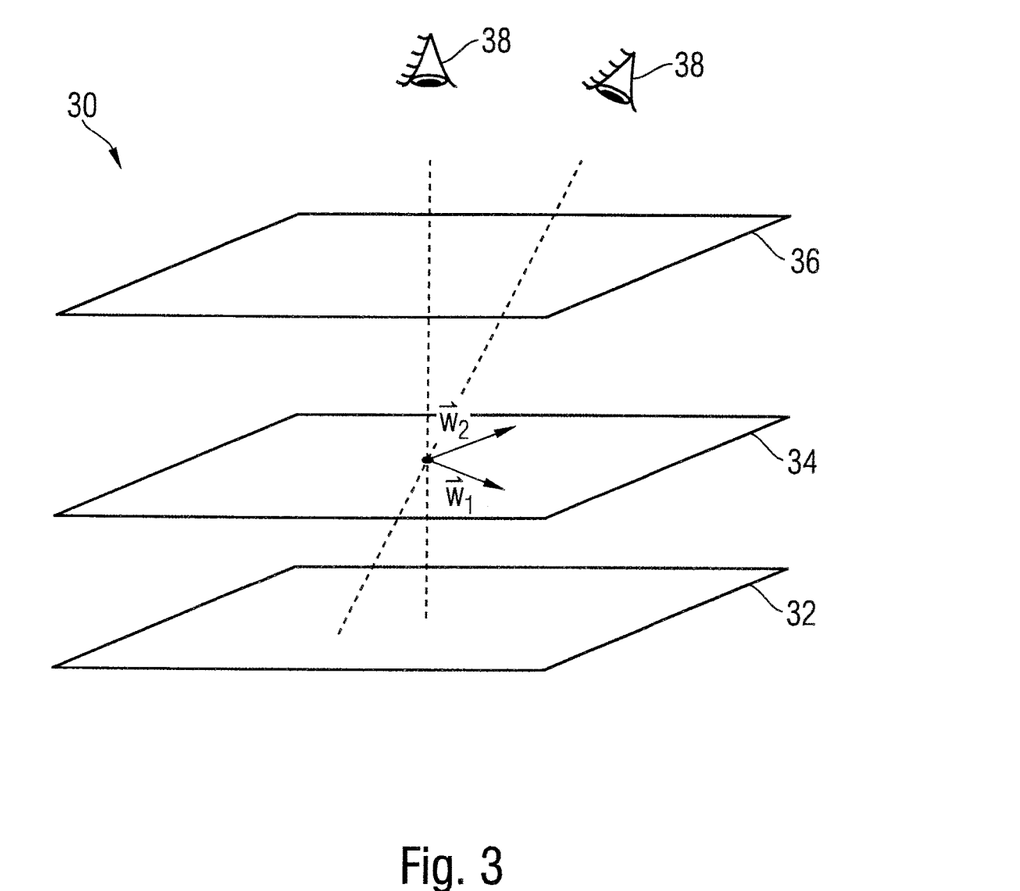

FIG. 3 shows, schematically, a modulo magnification arrangement 30, not depicted to scale, having a motif plane 32 in which the motif image with its motif image elements, arranged in cells, is located, and having a lens plane 34 in which a microlens grid is provided. The modulo magnification arrangement 30 produces an image plane 36 in which the target image perceived by the viewer 38 appears. For a more precise explanation of the functional principle and the properties of moiré magnification arrangements, micro-optical moiré-type magnification arrangements and of modulo magnification arrangements, reference is made to German patent applications 10 2005 062 132.5 and 10 2007 029 203.3, and to international applications PCT/EP2006/012374, PCT/EP2008/005173 and PCT/EP2008/005172, the disclosures of which are incorporated in the present application by reference.

Figure 4A:
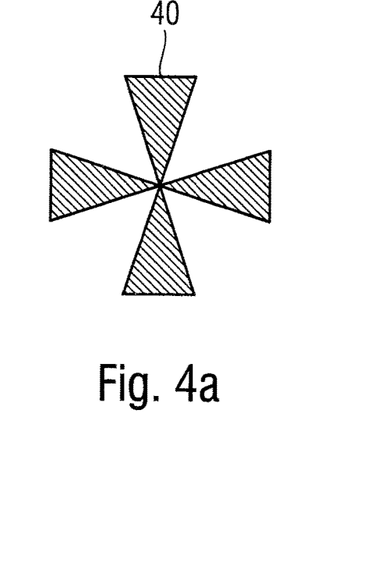
Figure 4B:
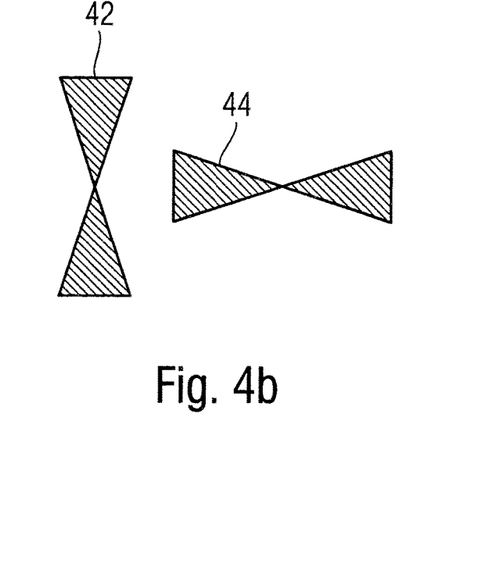

In the following, for the sake of simpler graphical illustration, the present invention is explained largely using the example of a moiré magnification arrangement in which the scaled-down images, arranged in the cells of the motif image, of the target image 40 or of the partial target images 42, 44 (FIG. 4) are each completely accommodated within one cell.

With reference to FIG. 4, FIG. 4(a) shows, as the target image to be depicted, a cross motif 40. According to the present invention, the cross motif 40 is broken down into multiple, for example, two, partial target images 42 and 44, as shown in FIG. 4(b), that, stacked in the right orientation and position, yield the complete target image.

Figure 4C:
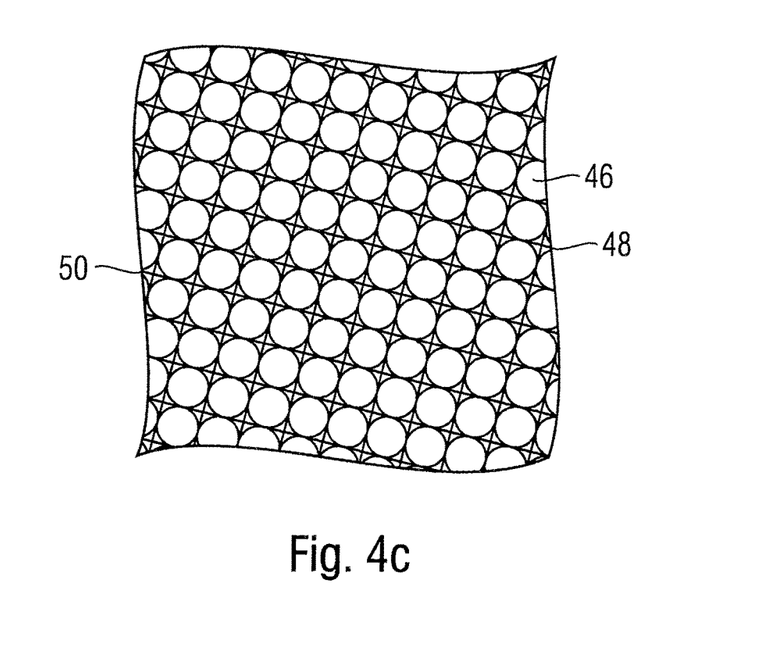

Further, FIG. 4(c) shows a specified lens array having spherical microlenses 46 that are arranged in a simple, rotated square lattice, the lens grid 48 having quadratic lattice cells 50. Here, the lens grid 48 can be described by a lens grid matrix W, as explained in detail in the above-specified German and international applications.

For the sake of simple illustration, in the exemplary embodiment, the magnification and movement behavior of the security element is specified in the form of a transformation matrix $$A = \begin{pmatrix} v & 0 \\ 0 & v \end{pmatrix}$$

which describes a pure magnification by a factor v. In general, upon tilting the depiction arrangement in different directions, the matrix A can describe, besides a magnification behavior, also a movement behavior, reference being made, for a more precise illustration, to the above-cited German and international applications, which include a number of examples for different movement patterns.

Figure 5A:
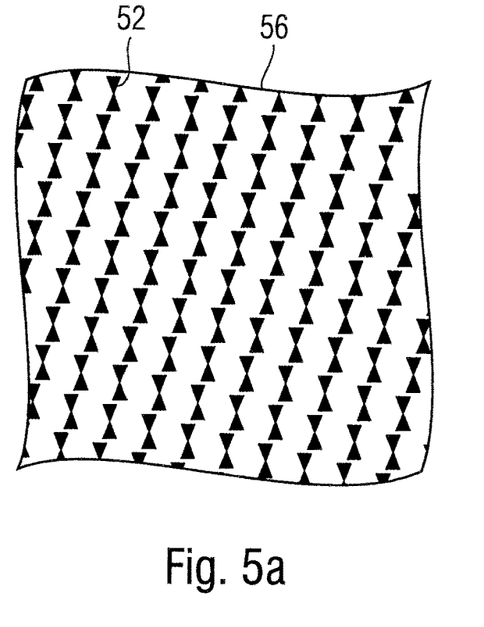
Figure 5B:
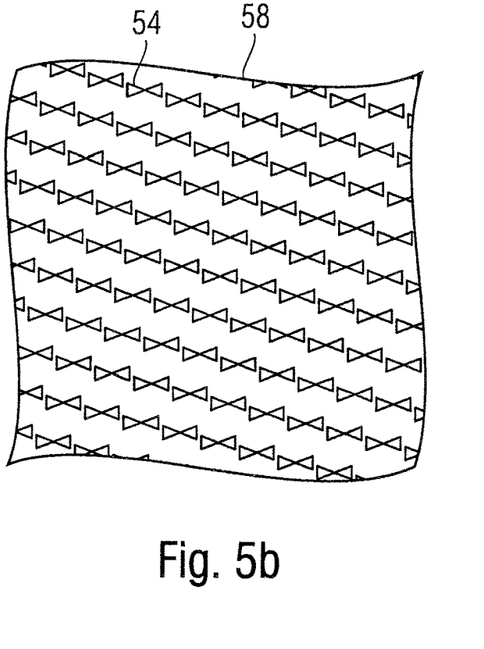

By applying the inverse matrix $A^{-1}$ to the partial target images 42 and 44, the micromotif elements 52 and 54 to be arranged in the motif image are obtained (FIG. 5). Here, the motif grid U in which the micromotif elements 52, 54 are to be arranged results in $$U = (I - A^{-1}) \cdot W$$

with the identity matrix I (see for example equation (M2) in DE 10 2007 029 203.3).

FIG. 5 shows, in each of (a) and (b), a section of the periodic arrangements 56, 58 of the micromotif elements 52 and 54 in the motif grid U, which are referred to in the following as partial motif grids 56 and 58. Here, only for the sake of better distinguishability are the micromotif elements 52 shown filled in and the micromotif elements 54 not filled in. What is key here is that the micromotif elements 52 and 54 that correspond to the partial target images 42, 44 are arranged in the same grid U in which, in a conventional moiré magnification arrangement, the micromotif element that corresponds to the complete target image 40 would be arranged. In other words, the two partial motif grids 56, 58 exhibit the same arrangement grid U, since for both partial motif grids, the same magnification and movement matrix A is used. Likewise important is that no phase jumps occur between the partial motif grids 56, 58. In this way it is ensured that the micromotif elements 52 and 54 in the two partial motif grids 56, 58 are always arranged in the correct phase relationship for the superimposition to form the complete target motif.

A further advantage is achieved through the split of the complete target motif into partial motifs: The individual micromotif elements 52 and 54 are, namely, easier to manufacture with the desired precision than a complete, scaled-down image of the cross motif 40, since in the center of the elements, only two triangle tips touch in each case, rather than four. The precise manufacture of the micromotif elements of moiré or generally of modulo magnification arrangements is fundamentally no easy task, since the lateral dimensions of the lattice cells of the motif image are typically significantly below 100 µm and especially between about 10 µm and about 35 µm.

Regular imprecisions in the micromotif elements, as can be created, for example, by a continuous offset of the tips of the triangles of the cross motif 40, are moiré magnified when the motif image is viewed with the viewing grid and can severely disrupt the visual appearance of the target image. The suggested split of the target image into partial target images thus offers, besides the non-visible code described in the following, the additional advantage that it facilitates a more precise manufacture of the motif image. This aspect can be taken into account especially in the type of split into partial target images, in that the specified target image is broken down into partial target images in such a way that the images of the individual partial target images exhibit shapes that are as easy to produce as possible.

For this, in the exemplary embodiment in FIG. 4, also, for example, a breakdown into four partial target images may be considered in which each partial target image comprises one of the triangles that form the cross motif 40. The micromotif elements that correspond to the partial target images can then be produced without converging tips. Reasons for the simpler manufacture through a suitable split lie in that, among other things, the dimension of the smallest manufacturable pattern size is normally significantly greater than the positioning precision of the patterns, and moreover, depends on the type of the patterns. So, for example, the individual triangles of the cross motif 40 can be positioned highly precisely such that, upon superimposition of the triangles, the tips meet exactly in the center when viewed.

Generally, a motif image could be composed, for example, alternatingly of micromotif elements 52 of the partial motif grid 56 and of micromotif elements 54 of the partial motif grid 58. Since the micromotif elements 52, 54 are arranged in the same grid U and without phase jumps between the partial motif grids, when viewed with the lens grid 48, a superimposition of the moiré-magnified partial target images 42, 44 is created for the human eye, to form a single motif, the target image 40. Instead of a uniform distribution, through the ratio of the areal contents having different micromotif elements 52, 54, also the relative intensity can be controlled with which the various partial target images 42, 44 within the complete image are perceived.

According to the present invention, through a suitable split of the motif image into regions having first or second micromotif elements is introduced into the motif image an additional hidden piece of image information whose information-bearing image patterns, due to their small dimensions, are not perceptible with the naked eye but can be verified, for example, as a higher-level security feature with a microscope. For this, in the exemplary embodiment, the split of the motif image into first and second microinformation regions occurs, which is fundamentally independent of the cell subdivision. Here, cells having different micromotif elements are included in each of the various microinformation regions, such that the microinformation regions can be distinguished from each other when examined closely.

Figure 6A:
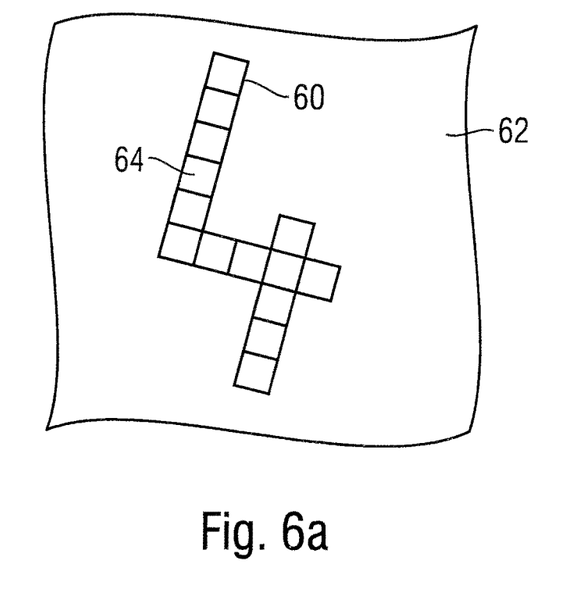

For illustration, FIG. 6 shows, in (a), a split of the motif image into first microinformation regions 60 and second microinformation regions 62. Here, the first microinformation regions 60 are developed in the shape of the numeral "4", while the second microinformation regions 62 form the surrounding region of the numerals. The shown arrangement of the microinformation regions repeats regularly outside the depicted section, such that a plurality of first and second microinformation regions 60, 62 is distributed over the surface area of the motif image. Alternatively, it is also conceivable that the shown arrangement of the microinformation regions repeats in irregular sequence within the motif image.

In the exemplary embodiment in FIG. 6, the microinformation regions 60, 62 are each formed from a plurality of cells 64 of the motif image. To obtain a single, complete motif image from the partial motif grids 56, 58 in FIG. 5, the horizontal micromotif elements 54 of the partial motif grid 58 are arranged in the cells 64 of the first microinformation regions 60, while the vertical micromotif elements 52 of the partial motif grid 56 are arranged in the second microinformation regions 62.

Figure 6B:
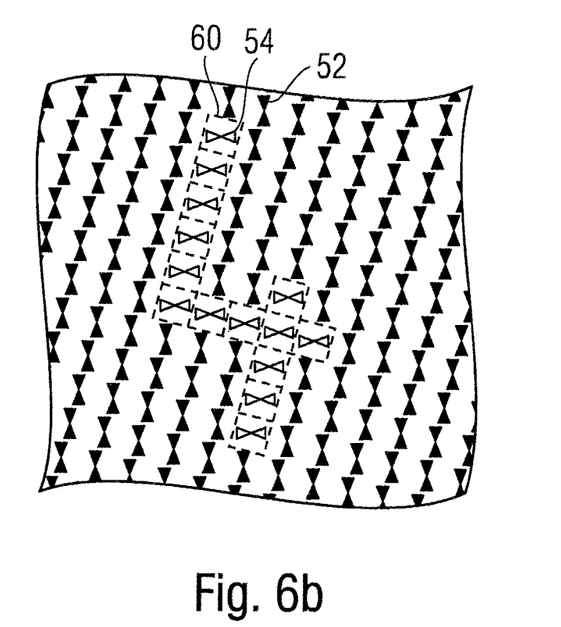
Figure 6C:
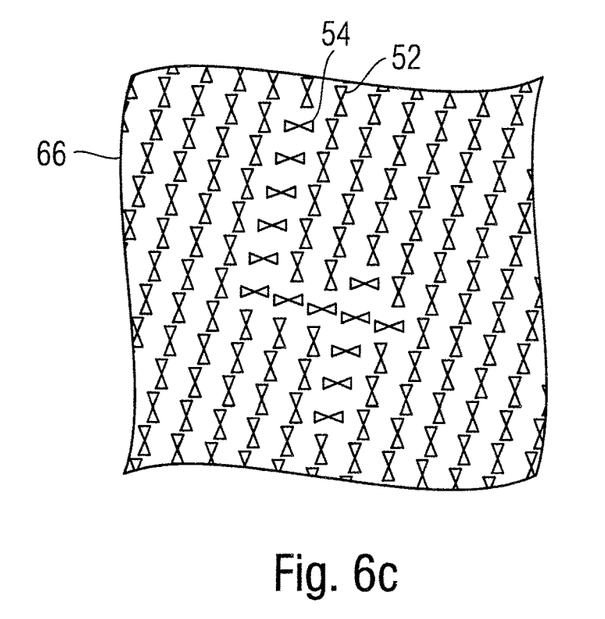

FIG. 6(b) shows schematically how the micromotif elements 52, 54, filled differently for clarification, are arranged in the first and second microinformation regions 60, 62. Here, the cells 64 that form the first microinformation regions 60 are additionally drawn in with dotted lines. FIG. 6(c) shows how the finished motif image 66 appears without the additional highlightings of the different regions.

For illustration, the principle according to the present invention is explained in the following with reference to periodically arranged cells of a specified size, and it is shown how, here, a hidden piece of image information can result.

The dimensions of the information-bearing image patterns of the image motif formed by the first microinformation regions 60, here the numeral "4", are, according to the present invention, significantly below the resolution limit of the human eye. The numeral "4" thus constitutes a piece of information that is hidden within the motif image and that can be detected, for example, with a microscope or another magnification device. The magnified appearance is shown schematically in FIG. 6(c). If the dimension of the cells 64 of the motif image is, for example, 30 µm×30 µm, then the numeral "4" of the first microinformation regions 60 extends across a region having a width of 5×30 µm=150 µm and a height of 9×30 µm=270 µm. Here, the dimensions of the information-bearing image patterns, in the exemplary embodiment the line widths of the patterns that form the numeral, are between approximately ⅒ and ⅓ of the height of the numeral, so between about 27 μm and about 90 μm, such that the numeral "4" is not resolvable with the naked eye.

In a variant that is not shown here, the first and second microinformation regions 60 and 62 are, rather than in the shape of the numeral "4" or of the surrounding region of the numeral, as is depicted in the section shown in FIG. 6, developed in the shape of a numeric string including multiple numerals, for example "1 2 3 4", or of the regions surrounding the individual numerals. Also this embodiment of the microinformation regions 60, 62 can repeat periodically or in irregular sequence, as appropriate, within the motif image.

Since the two partial motif grids 56 and 58 of the micromotif elements exhibit the same screening U and no phase jumps occur at the transition between the first and second microinformation regions 60, 62, the micromotif elements 52, 54 in the combined motif image 66 are in the correct phase relationship, such that the moiré magnified partial target images 42, 44 complement each other to form the complete target image 40 when viewed with the lens grid 48.

The relative intensity of the partial target images can be adjusted as desired through the surface area ratio of the first and second microinformation regions 60, 62. If the same brightness of the partial target images is to be achieved despite different surface area distributions, then the role of the first and second microinformation regions can be interchanged periodically. For example, the first microinformation regions 60 can be filled alternatingly with first 52 and second micromotif elements 54, and the second microinformation regions 62 accordingly filled alternatingly with second 54 and first micromotif elements 52, such that, overall, identical surface area proportions result for the first and second micromotif elements. It is possible to achieve the same result, for example, also in that the role interchange of the first and second microinformation regions occurs statistically over the surface area of the motif image.

Figure 7A:
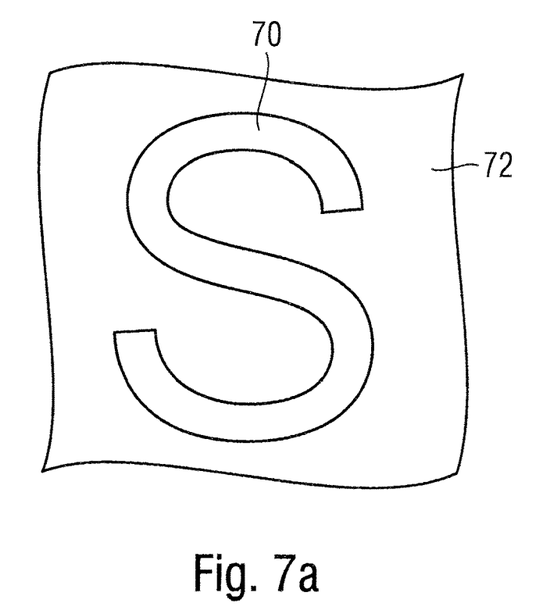

The split of the motif image into first and second microinformation regions need not follow the orientation of the motif image cells, but instead is independent of the cell subdivision of the motif image. For this, FIG. 7 shows, in (a), a split of the motif image into first microinformation regions 70 and second microinformation regions 72, the first microinformation regions 70 depicting the letter "S", while the second microinformation regions 72 form the surrounding region of the letter. Here, too, the arrangement of the microinformation regions outside of the section shown in (a) can repeat regularly or also in irregular sequence such that a plurality of first and second microinformation regions 70, 72 is distributed over the area of the motif image.

To obtain a single, complete motif image, the horizontal micromotif elements 54 of the partial motif grid 58 are arranged in the first microinformation regions 70, while the vertical micromotif elements 52 of the partial motif grid 56 are arranged in the second microinformation regions 72.

Figure 7B:
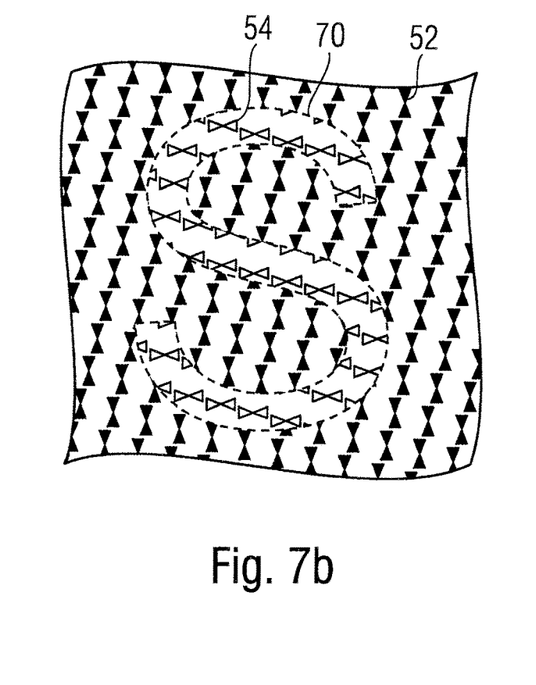
Figure 7C:
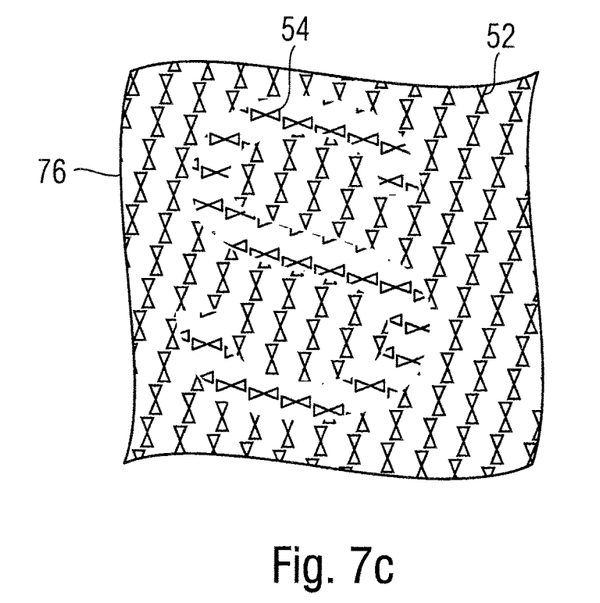

FIG. 7(b) shows schematically how the micromotif elements 52, 54, again filled differently for clarification, are arranged in the first and second microinformation regions 70, 72. In contrast to the embodiment in FIG. 6, in which the contour of the microinformation regions 60, 62 followed the cell boundaries, the arbitrarily developed contours of the microinformation regions 70, 72 intersect the cell boundaries, such that only portions of some cells are transferred to the microinformation regions 70, 72. FIG. 7(c) shows how the finished motif image 76 appears without the additional highlightings of the different regions.

Also in the exemplary embodiment in FIG. 7, the dimensions of the patterns of the letter "S" formed by the first microinformation regions 70 are significantly below the resolution limit of the human eye. Said letter thus constitutes a piece of information that is hidden within the motif image and whose presence can be detected with a microscope or another magnification device (FIG. 7(c)). If the dimension of the cells of the motif image is, for example, 30 μm×30 μm, then the letter "S" in FIG. 7(c) exhibits a width of 230 μm and a height of 300 μm. The dimensions of the patterns that form the letter, that is, the line widths, which are approximately ⅒ to ⅓ the height of the letter, are thus between about 30 μm and about 100 μm. Also the letter "S" is thus not resolvable with the naked eye.

Since the two partial motif grids 56 and 58 of the micromotif elements exhibit the same screening U and no phase jumps occur at the transition between the first and second microinformation regions 70, 72, the micromotif elements 52, 54 in the combined motif image 76 are in the correct phase relationship, such that the moiré magnified partial target images 42, 44 complement each other to form the complete target image 40 when viewed with the lens grid 48. It is understood that, here, too, the relative intensity of the partial target images can be adjusted as desired through the surface area ratio of the first and second microinformation regions. It is also possible to influence the relative intensity of the partial target images through the density of the micromotif elements 52, 54 in the first and second microinformation regions 70, 72, for example in that a portion of the micromotif elements is omitted in one of the microinformation regions In an alternative embodiment, the image motifs formed by the first and second microinformation regions can change over the surface area of the motif image. For example, in a first areal region, the first microinformation regions are, as shown in FIG. 7, developed in the shape of the letter "S", and the second microinformation regions by the region surrounding the letter, while in a second areal region of the motif image, the first microinformation regions are developed in the shape of a logo, and the second microinformation regions by the region surrounding the logo. In this way, it is possible to provide in the motif image, with the same visual appearance of the depicted target image, multiple different codes that are non-visible with the naked eye.

Instead of a simple numeral or a letter, as shown in FIGS. 6 and 7 for illustration, the microinformation regions can generally exhibit an arbitrary shape and, for example, also depict symbols, lettering, entire texts, objects of any kind, plants, animals or also people.

For example, the first microinformation regions can be developed in the shape of the individual "black" letters of a text, while the "white" spaces of the text surrounding the letters form the second microinformation regions. Here, the underlying text side is scaled down to the extent that the height of the letters is less than 300 μm in each case. Since the line width of the letters or numerals, depending on the font, is approximately ⅒ to ⅓ of the letter height, so is between about 30 μm and about 100 μm, the text is not readable with the naked eye. "White" and "black" regions lie next to each other, not resolvable for the naked eye.

In another variant, the first and second microinformation regions can be developed in the form of an image of arbitrary size, for example a portrait, that is formed by a whole of pixels or lines, for example in the form of a line drawing.

Particularly when the target image is split into more than two partial images, the microinformation regions can also include mapped regions composed of more than one partial target image and differ by the different combination of mapped regions. If the target image is split, for example, into three partial target images T1, T2 and T3, then a first microinformation region M1 could include mapped regions of the partial target images T1 and T2, a second microinformation region M2, mapped regions of the partial target images T2 and T3, a third microinformation region M3, mapped regions of the partial target images T1 and T3, and a fourth microinformation region M4, mapped regions only of the partial target image T1.

Due to the different filling with partial target images, the microinformation regions M1 to M4 can be distinguished when viewed with a microscope. When viewed without auxiliary means, in contrast, due to the phase relationship that is always present as a result of the construction, and to the identical screening U, the partial target images combine for the viewer to form a complete target image. The microinformation regions thus form, also here, a hidden piece of image information within the motif image. It is understood that the relative intensity of the partial target images can be adjusted as desired through the proportion of the partial target images in the mapped regions of the microinformation regions.

Even if the principle according to the present invention was explained with reference to moiré magnification arrangements, it is not limited to application in magnification arrangements having a moiré effect. Rather, also the target images from micro-optical moiré-type magnification arrangements or from modulo magnification arrangements can be broken down accordingly into partial target images.

Mathematically, it is possible to describe the split and encoding of a motif image through multiplication of the partial-motif image functions with characteristic functions for the microinformation regions:

Using the terminology explained in greater detail in application PCT/EP2008/005172 to describe modulo-magnification arrangements, here, a specified target image is described by an image function f(x,y) that can specify a brightness distribution (grayscale image), a color distribution (color image), a binary distribution (line drawing) or also other image properties, such as transparency, reflectivity, density or the like. In the exemplary embodiments in FIGS. 4 to 7, the image function f(x,y) describes, for example, the brightness distribution of the cross motif 40 shown in FIG. 4(a).

This target image f(x,y) is split into n partial motifs $f_i(x,y)$ with n≥2, such that $$f(x,y) = f_1(x,y) + f_2(x,y) + \ldots + f_n(x,y)$$

applies. In the exemplary embodiment in FIGS. 4 to 7, the target image 40 is split into n=2 partial target images 42 and 44, the image functions $f_1$ and $f_2$ describing the brightness distributions of the partial target images 42 and 44 shown in FIG. 4(b).

For two partial target images $f_1$ and $f_2$, the associated partial motif image functions $h_1$ and $h_2$ of a modulo magnification arrangement result in $$h_1\binom{x}{y} = \left(f_1\left(\binom{x}{y} + (A-I)\cdot\left(\binom{x}{y} \bmod W - W\cdot\binom{c_1}{c_2}\right)\right)\right)$$

and $$h_2\binom{x}{y} = \left(f_2\left(\binom{x}{y} + (A-I)\cdot\left(\binom{x}{y} \bmod W - W\cdot\binom{c_1}{c_2}\right)\right)\right)$$

wherein the matrix A describes a desired magnification and movement behavior of the depicted target image when the security element is tilted laterally and vertically, I is the 2×2 identity matrix, W refers to the lens grid matrix, and the vector ($c_1$, $c_2$) with 0≤$c_1$,$c_2$<1 specifies the relative position of the center of the lenses 22 (FIG. 2) within the cells of the motif image. The modulo operation s mod W, as a natural expansion of the usual scalar modulo operation, constitutes a reduction of a vector s to the fundamental mesh of the lattice described by a matrix W, so describes the "phase" of the vectors s within the lattice W. For a more precise explanation of the meaning of the individual terms and the generalization to location-dependent variables, reference is made to international application PCT/EP2008/005172, the disclosure of which is incorporated in the present application by reference.

In the exemplary embodiments in FIGS. 4 to 7, the partial motif image functions $h_1$ and $h_2$ describe precisely the arrangements 56 and 58 depicted in FIGS. 5(a) and (b). In a general modulo magnification arrangement, the partial motif image functions need not be composed of periodically repeated individual motifs, but rather can also constitute mapped sub-regions of a complex individual target image.

The split of the image motif into microinformation regions is now performed by characteristic functions $g_i(x,y)$, where i=1, 2, . . . n, that specify whether the partial-motif image function $h_i$ contributes to the complete motif image m(x,y) at the locus (x,y). In the case of two partial motifs, the characteristic functions are, for example, given by $$g_1\binom{x}{y} = \begin{bmatrix} 1 & \text{for } \textit{areal} \text{ elements having partial motif } f_1 \\ 0 & \text{otherwise} \end{bmatrix}$$

$$g_2\binom{x}{y} = 1 - g_1\binom{x}{y}$$

wherein $g_1$ describes, in the exemplary embodiment in FIG. 6, the periodic or in irregular sequence repeating of the numeral "4", in the exemplary embodiment in FIG. 7, the periodic or in irregular sequence repeating of the letter "S". It is understood that the function $g_1$ can, as described above, also describe a numeric string, a text of arbitrary length, or an image of arbitrary size, that can, if appropriate, repeat periodically or in irregular sequence.

The complete motif image m(x,y) then results in $$m(x,y) = h_1\binom{x}{y} \cdot g_1\binom{x}{y} + h_2\binom{x}{y} \cdot g_2\binom{x}{y},$$

so constitutes a superimposition of the partial-motif image function $h_1$ in regions in which $g_1$ is not equal to zero, and of the partial motif image function $h_2$ in the other regions, as shown, for example, as the motif image 66 in FIG. 6(c) or as the motif image 76 in FIG. 7(c).

In the exemplary embodiment addressed further above, in which a target motif is broken down into three partial motifs T1, T2 and T3, similarly, three partial motif images $h_1$, $h_2$ and $h_3$ result. To produce the microinformation regions M1 to M4, the characteristic functions can be chosen as follows:

$$g_1\begin{pmatrix}x\\y\end{pmatrix} = \begin{bmatrix} 1 & \text{if } (x, y) \text{ is in } M1, M3 \text{ or } M4 \\ 0 & \text{otherwise} \end{bmatrix}$$

$$g_2\begin{pmatrix}x\\y\end{pmatrix} = \begin{bmatrix} 1 & \text{if } (x, y) \text{ is in } M1 \text{ or } M2 \\ 0 & \text{otherwise} \end{bmatrix}$$

$$g_3\begin{pmatrix}x\\y\end{pmatrix} = \begin{bmatrix} 1 & \text{if } (x, y) \text{ is in } M2 \text{ or } M3 \\ 0 & \text{otherwise} \end{bmatrix}$$

In the complete motif image $$m(x, y) = h_1\begin{pmatrix}x\\y\end{pmatrix} \cdot g_1\begin{pmatrix}x\\y\end{pmatrix} + h_2\begin{pmatrix}x\\y\end{pmatrix} \cdot g_2\begin{pmatrix}x\\y\end{pmatrix} + h_3\begin{pmatrix}x\\y\end{pmatrix} \cdot g_3\begin{pmatrix}x\\y\end{pmatrix}$$

then precisely the above-described combinations of partial target images result in the microinformation regions M1 to M4 (M1 includes mapped regions of the partial target images T1 and T2, M2 includes mapped regions of the partial target images T2 and T3, M3 includes mapped regions of the partial target images T1 and T3 and M4 includes mapped regions of the partial target images T1).

We claim:

1. A depiction arrangement for security papers, value documents, electronic display devices or other data carriers, comprising a grid image arrangement for depicting a target image that is broken down into two or more partial target images, said depiction arrangement comprising:
    (a) a motif image that is subdivided into a plurality of periodically or at least locally periodically arranged cells in each of which are arranged mapped regions of one or more of the partial target images,
    (b) a viewing grid optically connectable to the motif image, said viewing grid composed of a plurality of viewing elements for viewing the motif image through the viewing grid, wherein the viewing grid, when the motif image is viewed through the viewing grid, reconstructs a complete target image from the mapped regions arranged in the cells,
    wherein the motif image, independently of the cell subdivision, is split and comprises at least first and second microinformation regions in which the cells each include different combinations of mapped regions of the partial target images, and wherein the microinformation regions are arranged in a shape of specified image motifs configured to exhibit information-bearing image patterns having dimensions that are below 100 µm;
    wherein the depiction arrangement comprises a magnification arrangement selected from the group consisting of:
        (i) a moiré magnification arrangement in which the mapped regions of the cells of the motif image each constitute scaled-down images of the partial target images, which are completely accommodated within one cell;
        (ii) a micro-optical moiré-type magnification arrangement in which the mapped regions of multiple spaced-apart cells of the motif image constitute in each case, taken together, a scaled-down image of one of the partial target images, whose dimension is larger than one cell of the motif image; and
        (iii) a modulo magnification arrangement in which the mapped regions of the cells of the motif image each constitute non-complete sections of one or more of the partial target images, the non-complete sections configured to be mapped by a modulo operation.

2. The depiction arrangement according to claim 1, characterized in that the microinformation regions each extend across multiple cells of the motif image.

3. The depiction arrangement according to claim 1, characterized in that the microinformation regions at least partially intersect cell boundaries of the motif image cells.

4. The depiction arrangement according to claim 1, characterized in that the information-bearing image patterns comprise pixels or lines.

5. The depiction arrangement according to claim 1 characterized in that the microinformation regions comprise alphanumeric characters, an alphanumeric character string or a logo.

6. The depiction arrangement according to claim 1, characterized in that the image motifs of the microinformation regions repeat periodically or in non-periodic sequence within the motif image.

7. The depiction arrangement according to claim 1, characterized in that the first and second microinformation regions each arranged in different specified regions within the motif image differ from each other, such that the image motifs of the respective microinformation regions change over an expanse of the motif image.

8. The depiction arrangement according to claim 1, characterized in that the cells of the motif image each include mapped regions of only one of the partial target images, and the first and second microinformation regions include mapped regions of different partial target images.

9. The depiction arrangement according to claim 1, characterized in that the arrangement of cells of the motif image and/or the viewing grid, in its periodic or at least locally periodic regions, exhibits no axis of symmetry in a plane defined by the arrangement or a plane defined by the grid.

10. The depiction arrangement according to claim 1, characterized in that, upon tilting the depiction arrangement, the complete target image moves in a specified direction that, with respect to the tilt direction, encloses an angle γ not equal to 0° and not equal to 90°.

11. The depiction arrangement according to claim 1, characterized in that the arrangement of cells of the motif image and the viewing grid form dissimilar lattices that are coordinated with each other such that, upon tilting the depiction arrangement, an orthoparallactic movement effect of the complete target image occurs.

12. The depiction arrangement according to claim 1, characterized in that periodicity length or local periodicity length of the viewing grid and/or the periodicity length or the local periodicity length of the cells of the motif image is between 3 µm and 50 µm, between 5 µm and 30 µm, or between about 10 µm and about 20 µm.

13. The depiction arrangement according to claim 1, characterized in that the viewing grid and the motif image are firmly joined together to form a security element having a stacked, spaced-apart viewing grid and motif image, especially in that the motif image and the viewing grid are arranged at opposing surfaces of an optical spacing layer.

14. The depiction arrangement according to claim 1, characterized in that the viewing grid and the motif image are arranged at different positions of a data carrier such that the viewing grid and the motif image are stackable for self-authentication and, in the stacked state, form a security element.

15. The depiction arrangement according to claim 1, characterized in that the grid image arrangement for depicting the target image that is broken down into two or more partial target images is combined with at least one further grid image arrangement for depicting the target image that is not broken down into partial target images.

16. The depiction arrangement according to claim 1, wherein the information-bearing image patterns have dimensions between 27 µm and 90 µm.

17. A depiction arrangement for security papers, value documents, electronic display devices or other data carriers, comprising a grid image arrangement for depicting a target image that is broken down into two or more partial target images, said depiction arrangement comprising:
  (a) a motif image that is subdivided into a plurality of periodically or at least locally periodically arranged cells in each of which are arranged mapped regions of one or more of the partial target images,
  (b) a viewing grid optically connectable to the motif image, said viewing grid composed of a plurality of viewing elements for viewing the motif image through the viewing grid, wherein the viewing grid, when the motif image is viewed through the viewing grid, reconstructs a complete target image from the mapped regions arranged in the cells,
  wherein the motif image, independently of the cell subdivision, is split and comprises at least first and second microinformation regions in which the cells each include different combinations of mapped regions of the partial target images, and wherein the microinformation regions are arranged in a shape of specified image motifs configured to exhibit information-bearing image patterns having dimensions that are below 100 µm;
  wherein the viewing elements comprise optical device selected from the group consisting of:
    (i) non-cylindrical microlenses or concave microreflectors, especially by microlenses or concave microreflectors having a circular or polygonally delimited base area;
    (ii) elongated cylindrical lenses or concave cylindrical reflectors whose dimension in a longitudinal direction of the cylindrical lenses measures more than 250 µm, more than 300 µm, more than 500 µm, or more than 1 mm; and
    (iii) circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

18. The depiction arrangement according to claim 17, wherein the information-bearing image patterns have dimensions between 27 µm and 90 µm.

19. A method for manufacturing a depiction arrangement, said method comprising steps in which
  a target image to be depicted is broken down into two or more partial target images,
  in a motif plane, a motif image is produced that is subdivided into a plurality of periodically or at least locally periodically arranged cells in each of which are arranged mapped regions of one or more of the partial target images,
  a viewing grid composed of a plurality of viewing elements for viewing the motif image with the viewing grid is produced, wherein the viewing grid, when the motif image is viewed, reconstructs the target image from the mapped regions arranged in the cells,
  the motif image being, independently of the cell subdivision, split into at least first and second microinformation regions in which the cells are each filled with different combinations of mapped regions of the partial target images, and the microinformation regions being arranged in a shape of specified image motifs that exhibit information-bearing image patterns having dimensions that are below 100 µm.

20. The method according to claim 19, wherein the information-bearing image patterns have dimensions between 27 µm and 90 µm.

* * * * *